(12) United States Patent
Baechtle et al.

(10) Patent No.: US 9,668,492 B2
(45) Date of Patent: Jun. 6, 2017

(54) METHOD FOR MANUFACTURING COEXTRUDED FOOD PRODUCTS

(71) Applicant: ALBERT HANDTMANN MASCHINENFABRIK GMBH & CO. KG, Biberach (DE)

(72) Inventors: Manfred Baechtle, Schemmerhofen (DE); Gerhard Mueller, Schemmerhofen (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 505 days.

(21) Appl. No.: 14/182,089

(22) Filed: Feb. 17, 2014

(65) Prior Publication Data

US 2014/0287666 A1    Sep. 25, 2014

(30) Foreign Application Priority Data

Mar. 21, 2013  (EP) .................................. 13160377

(51) Int. Cl.
| | | |
|---|---|---|
| *A22C 11/00* | (2006.01) | |
| *A22C 11/02* | (2006.01) | |
| *A22C 13/00* | (2006.01) | |
| *A23P 30/25* | (2016.01) | |

(52) U.S. Cl.
CPC .......... *A22C 11/02* (2013.01); *A22C 13/0003* (2013.01); *A22C 13/0006* (2013.01); *A23P 30/25* (2016.08)

(58) Field of Classification Search
CPC ....... A22C 11/00; A22C 11/001; A22C 11/02; A22C 11/0209; A22C 13/00; A22C 13/0003

USPC ....................................................... 452/40–44
See application file for complete search history.

(56) References Cited

U.S. PATENT DOCUMENTS

| | | | | |
|---|---|---|---|---|
| 3,422,489 A | * | 1/1969 | Middleton ............. | A22C 11/06 452/31 |
| 4,191,309 A | * | 3/1980 | Alley .................... | F04B 15/023 222/1 |
| 4,376,327 A | | 3/1983 | Curtis | |
| 4,691,411 A | * | 9/1987 | Higashimoto ......... | A22C 11/06 452/31 |
| 4,723,581 A | * | 2/1988 | Staudenrausch ....... | A22C 11/06 100/145 |

(Continued)

FOREIGN PATENT DOCUMENTS

| | | |
|---|---|---|
| CN | 1468540 A | 1/2004 |
| CN | 102217666 A | 10/2011 |

(Continued)

OTHER PUBLICATIONS

Office Action for Chinese Application No. 2014100953962, dated Jul. 30, 2015.

(Continued)

*Primary Examiner* — Richard Price, Jr.
(74) *Attorney, Agent, or Firm* — Marshall, Gerstein & Borun LLP

(57) ABSTRACT

In a device for manufacturing co-extruded food products with a filling machine, including a pump for an inner mass coupled to a drive and a control unit at least for the drive, to which a coextrusion unit disposed at the outside is connected, and to which a pump being coupled to a drive at least for delivering the outer mass to the coextrusion unit is connected. The drive of the outer mass pump is integrated into the inner mass filling machine.

13 Claims, 3 Drawing Sheets

(56) References Cited

U.S. PATENT DOCUMENTS

| | | | | |
|---|---|---|---|---|
| 4,797,973 A | * | 1/1989 | Righele | A22C 11/06 |
| | | | | 452/43 |
| 5,113,635 A | * | 5/1992 | Takai | B65B 9/207 |
| | | | | 452/31 |
| 5,158,498 A | * | 10/1992 | Frey | A22C 11/08 |
| | | | | 452/40 |
| 6,245,369 B1 | | 6/2001 | Kobussen et al. | |
| 6,988,943 B2 | * | 1/2006 | Reutter | A22C 13/0003 |
| | | | | 452/40 |
| 2005/0183584 A1 | | 8/2005 | Muller et al. | |

FOREIGN PATENT DOCUMENTS

| | | |
|---|---|---|
| EP | 0226925 A2 | 7/1987 |
| EP | 1057409 A1 | 12/2000 |
| WO | WO-2011087359 A1 | 7/2011 |

OTHER PUBLICATIONS

Flores Hector., "Principles of Coextrusion", Stork Food Systems, Sep. 24, 2008, pp. 1-44, XP002710031; Retrieved from the Internet on Aug. 6, 2013: URL:http://www.cmc-cvc.com/sites/default/files/files/Coextrusion.pdf.

Albert Handtmann Maschinenfabrik GmbH & Co. KG, "ConPro Systems", pp. 1-12, XP002710032; Retrieved from the Internet on Aug. 6, 2013: URL:http://ww.handtmann.de/uploads/media/ConPro_System.pdf.

Second Office Action, Chinese patent application No. 2014100953962, mailing date Apr. 14, 2016.

\* cited by examiner

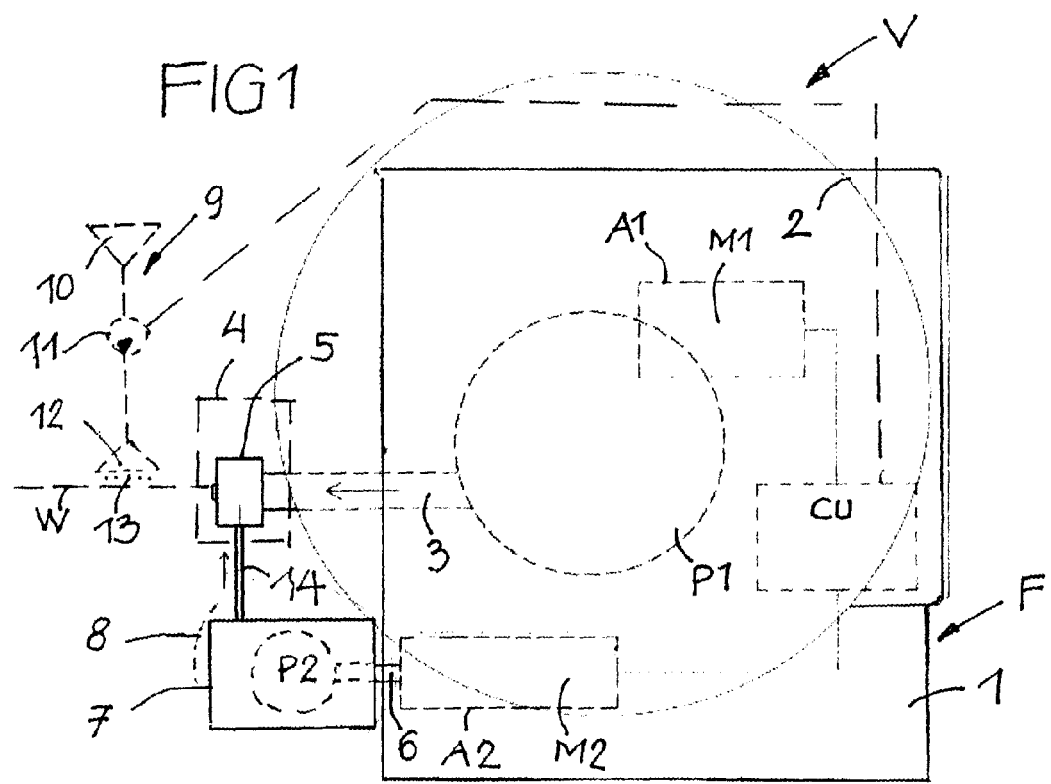

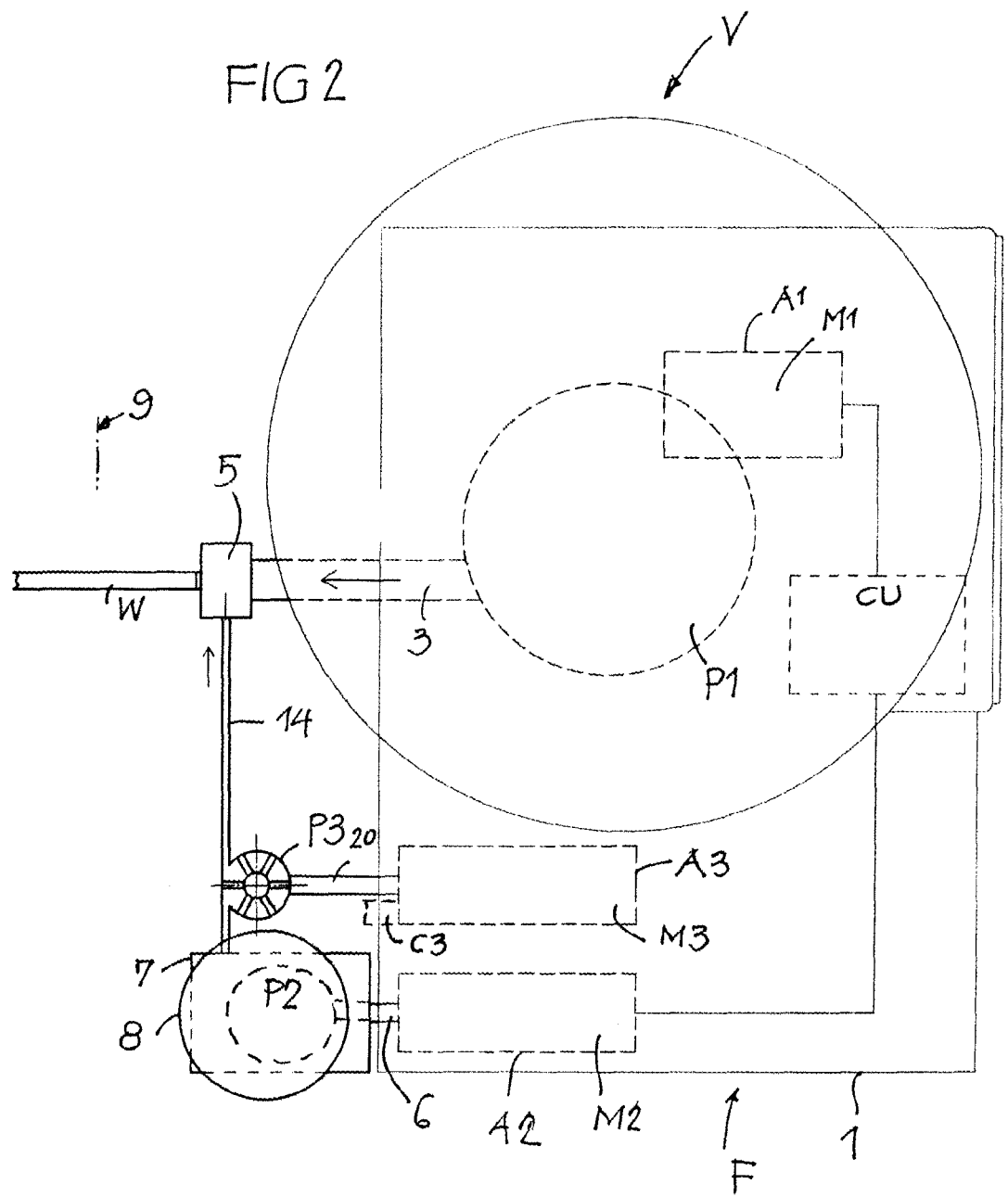

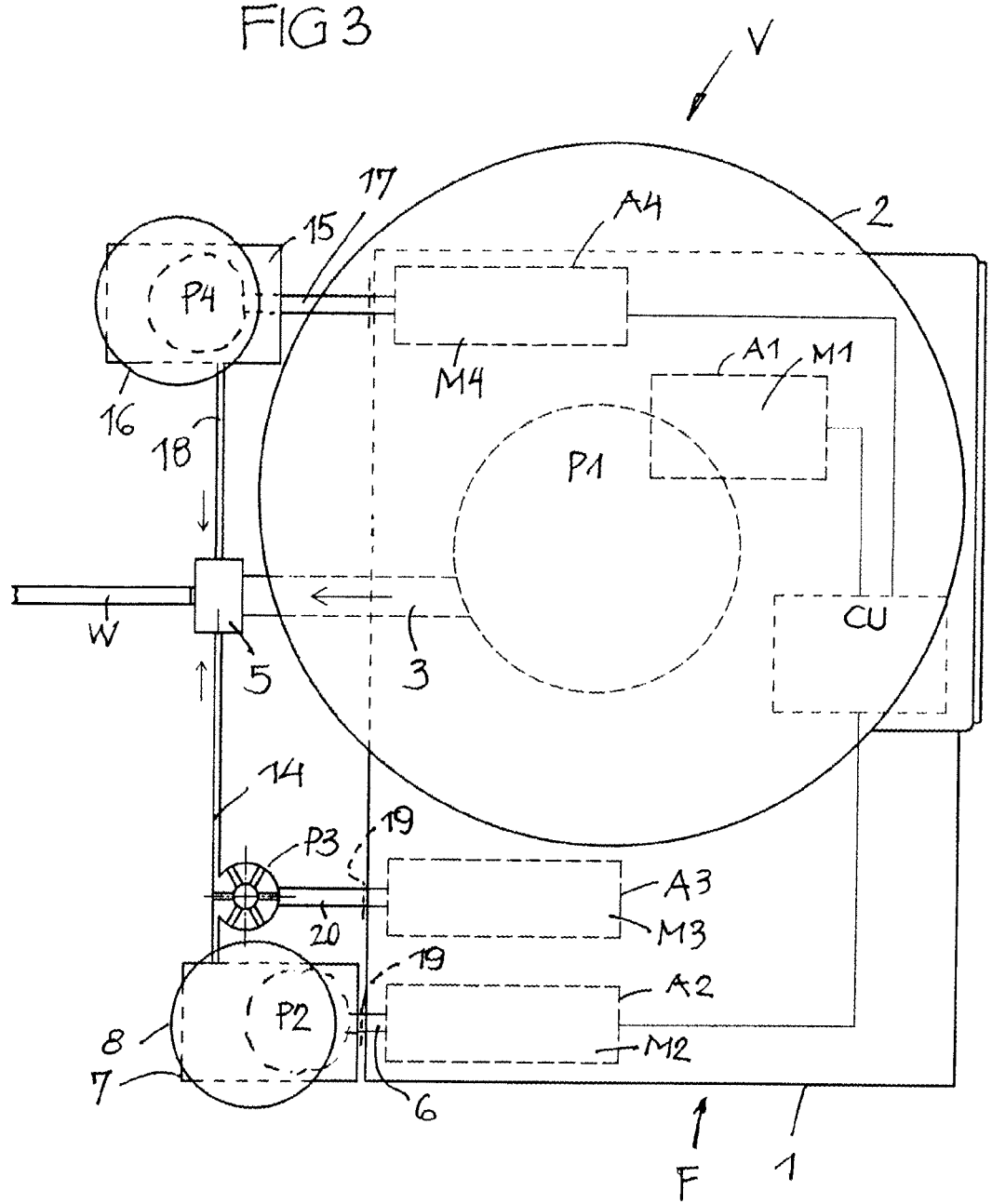

US 9,668,492 B2

METHOD FOR MANUFACTURING COEXTRUDED FOOD PRODUCTS

CROSS-REFERENCE TO RELATED APPLICATION

The present application claims priority to European Application No. 13 160 377.1, filed Mar. 21, 2013. The priority application, EPO 13 160 377.1, is incorporated herein by reference.

FIELD OF THE DISCLOSURE

This disclosure relates to the manufacture of co-extruded food products, and more particularly, to devices for co-extruding food products in which a pump for an outer mass is driven by a drive that is integrated into an inner mass filling machine.

BACKGROUND

Devices of the type ConPro 200 and ConPro 400 as well as ConPro link with the function "linking" and ConPro Therm with a cooking facility and loading robot of Albert Handtmann Maschinenfabrik GmbH & Co. KG, D-88400 Biberach/Riss are known, with which coextruded food products, e.g. food products coated with an outer mass, can be manufactured. A strand of a pasty inner mass, for example, sausage meat, is fully coated with a gel that is solidified, for example, using a fixer solution. The strand can subsequently be divided or linked. Separate filling machines for the inner mass and for the outer mass and a coextrusion unit are combined in the known devices. The filling machines must operate in manner coordinated with each other, since the amount of outer mass is to be matched exactly to the amount of inner mass. Each filling machine has its own control unit. The control unit units can optionally be connected to each other via a data interface. Each filling machine contains both the mass delivery pump as well as its drive. The inner mass filling machine can act as a master to which the outer mass filling machine is associated as a slave.

Devices of the type RS 191 of the Risco company for manufacturing such gel-coated sausage products are known in the market in which the outer mass is during co-extrusion fed by a pump being arranged in a coextrusion unit and comprising a drive in the coextrusion unit. The design is complex, since the inner and outer masses are provided by different machines and these machines are to be precisely coordinated with each other. The coextrusion unit requires an additional control unit, at least for the drive of the pump for the outer mass and/or can be linked via a data interface to the control unit of the inner mass filling machine.

The structural complexity of and the space required for the known devices again significantly increase if, for example, a further component such as a lubricant or adhesive agent needs to be processed, or a fixer solution is to be applied for solidifying the outer mass.

A device of this type is known from EP 0 226 925 A1 in which a gear wheel pump with its own drive is associated with a filling machine as a downstream machine unit.

In the known devices, no central control unit can be provided which is advantageous in view of simple operation, external data interfaces are possibly necessary, the device requires an inexpediently large amount of space, the costs of the device are high and the effort when cleaning the modules of the device is great.

SUMMARY OF THE DISCLOSURE

The present disclosure is based on the object to provide a device of the type previously mentioned that is more cost-effective than known solutions despite requiring less space and reducing the cleaning effort.

Since at least one additional drive is integrated into the inner mass filling machine, whereas every additional pump is placed outside of the inner mass filling machine, a central control unit of the drives is made possible which significantly facilitates operation of the device. External data interfaces are not necessary. The device requires less space and is less expensive while having the same performance. The cleaning effort is significantly reduced. At least the drive of the outer mass filling pump being arranged outside of the inner mass filling machine is in any case integrated into the inner mass filling machine.

If, in addition to the outer mass pump, further externally disposed pumps are provided, then their drives are as well advantageously integrated into the inner mass filling machine. It acts as a kind of drive center for peripheral pumps and can also centrally control them, if appropriate.

In a preferred embodiment, at least one further drive integrated into the inner mass filling machine is linked to the central control unit, namely, for example, that of the outer mass pump. A drive of an optionally provided fine-dosing pump for the outer mass can be excluded therefrom, which possibly is fixedly set or comprises its own control unit. However, in the event of an optionally provided fine-dosing pump, this does not exclude also linking its drive with the central control unit of the inner mass filling machine.

The pump for the inner mass is fixedly incorporated together with its drive into the inner mass filling machine, just like the drive for the outer mass pump placed at the outside of the filling machine, the drive of which is controlled by the central control unit.

In an advantageous embodiment, the fine-dosing pump for the outer mass is optionally disposed in the outer mass supply from the pump for the outer mass to the coextrusion unit, whereas its drive is likewise integrated into the inner mass filling machine.

If in a further embodiment, at least one third component is optionally to be processed, such as a lubricant or an adhesive agent, then a component pump for this third component can be placed on the outside of the single inner mass filling machine and have its drive also be integrated into the inner mass filling machine and possibly linked to the central control unit.

In all the embodiments previously described, an additional module having its own pump can be placed outside of the single inner mass filling machine, the drive of which can be connected to the central control unit, a fixer solution be applied onto or into the coextruded food product exiting from the coextrusion unit.

The further pumps placed on the outside of the inner mass filling machine are advantageously either fixedly or removably mounted to the inner mass filling machine.

Each further pump disposed on the outside, other than possibly the fine-dosing pump, can be incorporated directly into a respective reservoir which, preferably, comprises a hopper. These modules can be structurally simple and compact because they do not comprise any drive systems to be controlled.

Each of the drives integrated in the inner mass filling machine advantageously comprises an electric drive motor, possibly combined with a gear or the like. Electric motors, hydraulic or pneumatic drives can serves as drives.

The structural complexity is low and enables easy changeover when each drive integrated into the inner mass filling machine is coupled with the associated pump via a drive train led from the inner mass filling machine to the outside.

With regard to small space requirement, it is advantageous if the coextrusion unit and the further pumps connected to a coextrusion head of the coextrusion unit are distributed on the outside around a base frame with a hopper of the inner mass filing machine and attached thereto, e.g. with ground clearance for better cleaning of the external surrounding of the filling machine.

The inner mass filling machine is advantageously a vacuum filler, for example, for sausage meat, although other food products can also be processed with the device in this manner.

BRIEF DESCRIPTION OF THE SEVERAL VIEWS OF THE DRAWINGS

FIG. 1 shows a schematic top view of a device for manufacturing co-extruded food products, FIG. 2 shows a top view of a further embodiment of the device, and FIG. 3 shows a top view of yet a further embodiment of the device.

DETAILED DESCRIPTION OF THE PREFERRED EMBODIMENTS

FIG. 1 illustrates a top view of a device V for manufacturing co-extruded food products, specifically, for example, coextruded sausage products W. The device V comprises an inner mass filling machine F with a pump P1 for delivering an inner mass fixedly integrated into a base frame 1 comprising a hopper 2. The inner mass filling machine F delivers sausage meat via an inner mass supply 3 to the outside to a coextrusion unit 4 disposed there. The pump P1 is connected to a drive A1, e.g., fixedly integrated into the base frame 1 and comprising an electric motor M1 which is linked to a central control unit CU of the inner mass filling machine F. The central control unit CU can also be disposed in the base frame 1 or be arranged on the outside or near it.

The coextrusion unit 4 comprises a coextrusion head 5 from which the coextruded sausage product W exits after the inner mass has been coated with an outer mass being supplied by a pump P2 being arranged outside of the base frame 1 and used for delivering the outer mass via an outer mass supply 14 to the coextrusion head 5. The pump P2 is coupled via a drive train 6 with a drive A2 comprising an electric motor M, and being fixedly integrated into the inner mass filling machine F or its base frame 1, respectively, and linked with the control unit CU.

The pump P2 can be directly provided with a reservoir 7, which can preferably be equipped with a hopper 8 for the outer mass. The pump P2 or the reservoir 7, respectively, is advantageously fixedly or removably attached to the filling machine.

Although the device V is in FIG. 1 primarily aimed at the production of the gel-coated sausage product W, FIG. 1 shows optional additional equipment with a module 9 downstream of the coextrusion unit 4, where the module 9 comprises a reservoir or a hopper 10 for a fixer solution which is applied via a manifold 12 as indicated at 13 onto the co-extruded sausage product W using a supply and/or dosing pump 11. The pump 11 can optionally be linked to the central control unit CU.

FIG. 2 illustrates a top view of an embodiment of the device V extended in comparison with FIG. 1, where here as well, further drives A2, A3, A4 are like the fixedly integrated drive A1 integrated into the inner mass filling machine F.

Since for some products, the outer mass must be dosed very precisely relative to the inner mass, a fine-dosing pump P3, as shown in FIG. 2, can additionally be employed. This fine-dosing pump P3 is, for example, disposed in the outer mass supply 14 from the pump P2 to the coextrusion head 5 and is via a drive train 20 coupled with the drive A3 which is integrated, for example, in the base frame 1 of the inner mass filling machine F and comprises an electric motor M3. The further design of the device V in FIG. 2 corresponds to that of FIG. 1, although module 9 is omitted, which can optionally nevertheless still be provided.

The further drive A3 of the fine-dosing pump P3 is in FIG. 2 not linked to the central control unit CU, but either fixedly set or provided with its own control unit C3 (adjustment device), for example, on the base frame 1. Alternatively, the further drive A3 or its electric motor M3, respectively, could be linked to the central control unit CU.

FIG. 3 in a schematic top view illustrates a further embodiment of the device V, for example, for cases of application in which a third component is to be processed in a coextrusion process, e.g. a lubricant or an adhesive agent which is during coextrusion introduced between the strand of inner mass and the coating of outer mass. Alternatively, this third component could also be a further layer of foodstuff. In order to be able to incorporate this third component, a further pump P4, for example, with a reservoir 15 and a hopper 16, is in the embodiment of FIG. 3 similar to the pump P2 for delivering the outer mass, disposed outside at the base frame 1 of the inner mass filling machine F and connected with the coextrusion head 5 via a component supply 18. The further pump P4 is via a drive train 17 in communication with a further drive A4 which is integrated into the inner mass filling machine F and comprises an electric motor M4 and is linked to the central control unit CU.

It is in FIG. 3 indicated at the drive trains 17, 20, 6 with dashed lines, that a removable or detachable connection can there be provided. This confirms that the further pumps P2, P3, P4, the drives A2, A3, A4 of which are fixedly integrated into the inner mass filling machine F, can be removably attached to the inner mass filling machine F.

The cleaning effort for the respective embodiment of FIGS. 1 to 3 is reduced at least by the fact that the further drives A2 to A4 are integrated into the inner mass filling machine F and the components of the further pumps P2 P3 and P4 coming in contact with the respective mass are therefore easier to clean. Cleaning agents used do not reach the drives A2, A3, A4 and the pumps P2 to P4 with their reservoirs are easy to clean, can possibly be arranged off the ground or supported only on slim legs.

The coextrusion unit 4 or the coextrusion head 5, respectively, can comprise further downstream processing modules, for example, devices for dividing the continuously produced strands into shorter portions with clean-shaped ends, and/or devices for thermal treatment or application of further treatment agents, for suspending the divided portions for smoking and/or for packaging

The invention claimed is:

1. A device for manufacturing co-extruded food products having an inner mass coated by an outer mass, the device comprising:
   an inner mass filling machine including
      a base frame,
      a hopper for holding the inner mass,
      a first pump configured to discharge the inner mass from the hopper, a first drive operably connected to the first pump and configured to drive the first pump, and a control unit;

a coextrusion unit disposed outside of the inner mass filling machine;

an inner mass supply configured to supply the coextrusion unit with the inner mass discharged from the inner mass filling machine by the first pump;

an outer mass reservoir for holding the outer mass;

a second pump disposed outside of the inner mass filling machine and configured to discharge the outer mass from the outer mass reservoir;

a second drive operably connected to the second pump and configured to drive the second pump;

an outer mass supply configured to supply the coextrusion unit with the outer mass discharged from the outer mass reservoir by the second pump;

the coextrusion unit being configured to coat the inner mass supplied by the inner mass supply with the outer mass supplied by the outer mass supply; and wherein the first drive and the second drive each is integrated into the base frame of the inner mass filling machine and linked to the control unit of the inner mass filling machine.

2. The device according to claim 1, further comprising a further pump disposed outside of the inner mass filling machine, the further pump being operably connected to a further drive, wherein the further drive is integrated into the base frame of the inner mass filling machine.

3. The device according to claim 2, wherein the further pump includes a fine-dosing pump arranged in the outer mass supply upstream of the coextrusion unit.

4. The device according to claim 2, wherein the further pump includes a food product component pump having a reservoir for the food product component, the food product component pump being disposed on the outside of the inner mass filling machine, the food product component pump being connected to the coextrusion unit via a food component supply separate from the inner mass supply and the outer mass supply.

5. The device according to claim 2, the further pump being fixedly or detachably attached to the base frame of the inner mass filling machine.

6. The device according to claim 2, comprising a further control unit linked to the further drive.

7. The device according to claim 2, the coextrusion unit including a coextrusion head, wherein the further pump is operably connected to the coextrusion head.

8. The device according to claim 2, the further drive being linked to the control unit of the inner mass filling machine.

9. The device according to claim 2, wherein each drive of the first drive, the second drive, and the further drive comprises an electric drive motor or is embodied as a hydraulic or pneumatic drive.

10. The device according to claim 1, the second pump being fixedly or detachably attached to the base frame of the inner mass filling machine.

11. The device according to claim 1, wherein each drive of the first and second drives comprises an electric drive motor or is embodied as a hydraulic or pneumatic drive.

12. The device according to claim 1, the second drive is operably connected to the second pump via a drive train, wherein the drive train extends from said inner mass filling machine to the outside of the inner filling machine and further to the second pump.

13. The device according to claim 1, the inner mass filling machine being a vacuum filler.

* * * * *